(12) United States Patent
Cheng et al.

(10) Patent No.: US 9,863,536 B2
(45) Date of Patent: Jan. 9, 2018

(54) MULTI-MATERIAL SEAL HAVING A SEAL BODY AND CORE

(71) Applicant: ONESUBSEA IP UK LIMITED, London (GB)

(72) Inventors: Hoi Ling Cheng, Houston, TX (US); Bryan Matthew Tu, Houston, TX (US)

(73) Assignee: ONESUBSEA IP UK LIMITED, London (GB)

( * ) Notice: Subject to any disclaimer, the term of this patent is extended or adjusted under 35 U.S.C. 154(b) by 0 days.

(21) Appl. No.: 14/984,345

(22) Filed: Dec. 30, 2015

(65) Prior Publication Data
US 2017/0191565 A1 Jul. 6, 2017

(51) Int. Cl.
| | | |
|---|---|---|
| F16J 15/10 | (2006.01) | |
| E21B 33/00 | (2006.01) | |
| F16J 15/12 | (2006.01) | |
| F16J 15/3284 | (2016.01) | |

(52) U.S. Cl.
CPC ........... *F16J 15/102* (2013.01); *E21B 33/00* (2013.01); *F16J 15/121* (2013.01); *F16J 15/3284* (2013.01)

(58) Field of Classification Search
CPC ......... F16J 15/10; F16J 15/102; F16J 15/104; F16J 15/12; F16J 15/121; F16J 15/127
See application file for complete search history.

(56) References Cited

U.S. PATENT DOCUMENTS

| | | | | |
|---|---|---|---|---|
| 4,345,739 A | * | 8/1982 | Wheatley | F16J 15/022 251/358 |
| 4,597,583 A | * | 7/1986 | Inciong | F16J 15/121 277/591 |
| 5,535,899 A | * | 7/1996 | Carlson | A61J 11/045 215/11.1 |
| 8,201,832 B2 | * | 6/2012 | Kocurek | E21B 33/03 277/603 |
| 8,800,648 B2 | | 8/2014 | Kocurek et al. | |
| 2003/0209857 A1 | | 11/2003 | Keene | |
| 2012/0248703 A1 | | 10/2012 | Kocurek | |

FOREIGN PATENT DOCUMENTS

| | | | |
|---|---|---|---|
| DE | 10306728 A1 | 9/2004 | |
| DE | 102012216271 A1 | 3/2014 | |
| EP | 2138746 A1 | 12/2009 | |
| GB | 1187967 A | 4/1970 | |
| JP | 58028057 A * | 2/1983 | ............... F16J 15/12 |
| JP | 62020971 A * | 1/1987 | |

OTHER PUBLICATIONS

PCT International Search Report & Written Opinion for PCT Application No. PCT/EP2016/080340 dated Feb. 16, 2017; 12 Pages.

* cited by examiner

*Primary Examiner* — Gilbert Y Lee
(74) *Attorney, Agent, or Firm* — Fletcher Yoder, P.C.

(57) ABSTRACT

A system may include a seal including a seal body having an exterior with a seal interface. Additionally, the system may include a core disposed internally within and surrounded by the seal body. A gas permeability of the core may be less than a gas permeability of the seal body, a coefficient of thermal expansion of the core may be less than a coefficient of thermal expansion of the seal body, or a combination thereof.

13 Claims, 7 Drawing Sheets

MULTI-MATERIAL SEAL HAVING A SEAL BODY AND CORE

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Fluid systems, such as mineral (e.g., oil and gas) extraction systems and transport systems, typically include multiple segments of tubing, valves, and connectors that are sealed together by various seals. Seals are often constructed from elastomeric materials. In some fluid systems, these elastomeric seals may be subjected to harsh environmental conditions, such as exposure to extreme pressures and/or extreme temperatures. Such harsh environmental conditions may decrease the effectiveness of the seals. For example, when an elastomeric seal is exposed to low temperatures, the seal may contract such that it loses effectiveness. Additionally, when a seal is exposed to high pressure gas at high temperatures, for example, gases may diffuse across the elastomeric material of the seal. The gases may permeate out of the elastomeric material as the gases expand when the system is depressurized. However, if the rate of decompression and expansion is high, explosive decompression (also referred to as rapid gas decompression) may occur, in which event the gases trapped within the elastomeric material cause fissuring and seal failure.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

Figure 1:
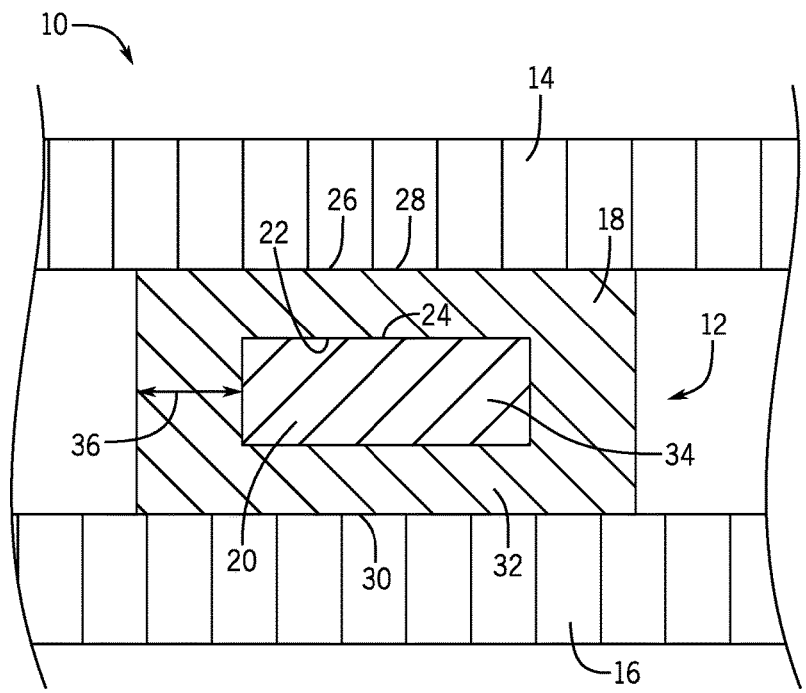
FIG. 1 is a cross-sectional view of a system including a seal having a seal body and a core disposed within the seal body, in accordance with an embodiment of the present disclosure.

One or more specific embodiments of the present disclosure will be described below. These described embodiments are only exemplary of the present disclosure. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The drawing figures are not necessarily to scale. Certain features of the embodiments may be shown exaggerated in scale or in somewhat schematic form, and some details of conventional elements may not be shown in the interest of clarity and conciseness. Although one or more embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

When introducing elements of various embodiments of the present disclosure, the articles "a," "an," and "the" are intended to mean that there are one or more of the elements. The terms "comprising," "including," and "having" are used in an open-ended fashion, and thus should be interpreted to mean "including, but not limited to . . . ". Moreover, the use of "top," "bottom," "above," "below," and variations of these terms is made for convenience, but does not require any particular orientation of these components.

As discussed below, present embodiments are directed to a seal including a seal body and a core disposed within (e.g., disposed internally within and surrounded by) the seal body. The seal body and the core are made of different materials having different characteristics. For example, in certain embodiments, the material of the core may have a coefficient of thermal expansion that is less than a coefficient of thermal expansion of the material of the seal body. In some embodiments, the material of the core may have a negative coefficient of thermal expansion such that that core expands with decreasing temperature. As such, the core may reduce or minimize the contraction of the seal (e.g., the total reduction length, width, and/or height) in low temperatures. Thus, the core may increase the effectiveness of the seal in low temperatures. Further, in some embodiments, the material of the core may have a gas permeability that is less than a gas permeability of the material of the seal body. As such, the core may reduce the cross-sectional area of the seal that is susceptible to gas diffusion, thereby reducing or minimizing the likelihood and/or effects of explosive gas decompression.

FIG. 1 is a partial cross-sectional view of an embodiment of a system 10 having a seal 12 disposed between a first structure (e.g., component, body, wall, etc.) 14 and a second structure (e.g., component, body, wall, etc.) 16. The first and second structures 14 and 16 may be annular (e.g., tubing), planar (e.g., planar walls), partially or entirely curved, or any combination thereof. The system 10 may be configured to handle fluids (e.g., liquids and/or gases). As discussed below, the system 10 may be a mineral extraction system configured to extract subterranean natural resources, such as oil and gas. In some embodiments, the system 10 may be an aircraft system or a spacecraft system. In certain embodiments, the operating environment of the system 10 may include extreme (e.g., high and/or low) pressures and/or extreme temperatures. For example, in some embodiments, the seal 12 may be used to isolate regions of gases or fluids with pressure differentials across the seal 12 of 30 megapascal (MPa), 70 MPa, 100 MPa, or greater. Further, the seal 12 may be exposed to temperatures ranging from −45 degrees Celsius (° C.) to 210° C., for example.

In some embodiments, the seal 12 may be an annular seal, such as an O-ring seal, a T-seal, an S-seal, a C-ring seal, and so forth. In certain embodiments, the seal 12 may be a face seal, such as an O-ring seal, a C-ring seal, a gasket, and so forth. It should be noted that while the illustrated embodiment of the system 10 includes one seal 12, the system 10 may be include any number of seals 12, such as two, three, four, five, six, seven, eight, nine, ten, or more. Further, in embodiments in which the system 10 includes two or more seals 12, the two or more seals 12 may be the same type (e.g., both O-ring seals) or different types (e.g., an O-ring seal and a T-seal). Additionally, it should be noted that the first and second structures 14 and 16 may be any suitable structures in any suitable arrangement.

The seal 12 includes a seal body 18 and a core 20 (e.g., seal core, solid core). The core 20 is disposed internally within the seal body 18. Additionally, the core 20 may be partially or entirely surrounded by seal body 18. Accordingly, the seal body 18 includes an inner surface 22 (e.g., an inner face) that generally interfaces with (e.g., contacts) at least a portion of an outer surface 24 of the core 20. In some embodiments, the inner surface 22 may interface with the entire outer surface 24 of the core 20 such that the core 20 is entirely surrounded by the seal body 18. It should be appreciated that while the inner surface 22 is generally rectangular in the illustrated embodiment, the inner surface 22 may have any suitable geometry or shape, such as a square, a circle, an oval, a trapezoid, a T-shape, an irregular shape, and so forth. Additionally, it should be noted that the inner surface 22 may include faces or portions that are curved, flat, tapered, grooved (e.g., including bumps, protrusions, indentations, recesses, or similar features) or any combination thereof. In certain embodiments, each structure, surface, and material shown in FIG. 1 may extend circumferentially about an axis, and thus may have a generally curved shape (e.g., annular). In other words, the illustrated cross-section may be taken through an annular seal 12 with an annular seal body 18, annular core 20, etc.

Additionally, the seal body 18 includes an outer surface 26 (e.g., an exterior, an outer face) that generally interfaces with (e.g., contacts) the first and second structure 14 and 16. For example, in some embodiments, the outer surface 26 may include a first outer face 28 (e.g., a first seal interface) that interfaces with the first structure 14 and a second outer face 30 (e.g., a second seal interface) that interfaces with the second structure 16 and is disposed opposite from the first outer face 28. It should be appreciated that while the outer surface 26 is generally rectangular in the illustrated embodiment, the outer surface 26 may have any suitable geometry or shape, such as a square, a circle, an oval, a trapezoid, a T-shape, an irregular shape, and so forth. For example, the shape of the outer surface 26 may vary for different types of seals (e.g., annular seals, face seals, O-ring seals, T-ring seals, S-ring seals, C-ring seals, gasket seals, and so forth). Additionally, it should be noted that the outer surface 26 may include faces or portions that are curved, flat, tapered, grooved (e.g., including bumps, protrusions, indentations, recesses, or similar features) or any combination thereof. Further, the inner surface 22 and the outer surface 26 of the seal body 18 may have the same or different geometries or shapes. Additionally, as discussed in more detail below with respect to FIG. 3, the dimensions of the seal body 18, the dimensions of the core 20, and the arrangement of the core 20 in the seal body 18 (e.g., centered, offset, etc.) may vary in different embodiments.

The seal body 18 includes a first material 32, and the core 20 includes a second material 34 that is different from the first material 32. The first material 32 has different material characteristics or properties than the second material 34. In some embodiments, the first material 32 of the seal body 18 may have a first coefficient of thermal expansion that is greater than a second coefficient of thermal expansion of the second material 34 of the core 20. For example, in some embodiments, the first material 32 may include an elastomeric material (e.g., an elastomer), such as natural rubber, synthetic rubber, nitrile rubber, silicone rubber, polyisoprene, polybutadiene, ethylene propylene rubber, fluoroelastomer, a thermoplastic elastomer (TPE), and so forth. In certain embodiments, the second material 34 may include a metallic material (e.g., a metal or metal alloy), such as steel, iron, titanium, tungsten, platinum, a nickel-based alloy (e.g., a nickel-iron alloy, a nickel-titanium alloy, etc.), and so forth. In some embodiments, the second material 34 may include a thermoplastic polymer (e.g., polytetrafluoroethylene (PTFE), polyether ether ketone (PEEK), etc.), a plastic (e.g., a high temperature plastic), or any other material with a lower coefficient of thermal expansion than the first material 32. In some embodiments, the second material 34 may be corrosion resistant. In some embodiments, the first coefficient of thermal expansion of the first material 32 of the seal body 18 may be between one and 25 times, three and 20 times, five and 15 times, or seven and ten times greater than the second coefficient of thermal expansion of the second material 34 of the core 20. In some embodiments, the first coefficient of thermal expansion of first material 32 may be greater than 1.5, two, three, four, five, six, seven, eight, nine, ten, times the second coefficient of thermal expansion of the second material 34. In certain embodiments, the second coefficient of thermal expansion of the second material 34 may be between approximately 5% and 95%, 10% and 90%, 20% and 85%, 30% and 80%, or 40% and 75% of the first coefficient of thermal expansion of the first material 32.

In some embodiments, both the first material 32 and the second material 34 may have positive coefficients of thermal expansion such that the first and second materials 32 and 34 expand (e.g., increase in at least one dimension, cross-sectional area, and/or volume) with increasing temperature and contract (e.g., decrease in at least one dimension, cross-sectional area, and/or volume) with decreasing temperature. However, because the second material 34 has a smaller coefficient of thermal expansion than the first material 32, the second material 34 may contract to a lesser extent or degree as compared to the first material 32 when exposed to low temperatures. Thus, by forming the core 20 with the second material 34 that has a lower coefficient of thermal expansion than the first material 32 of the seal body 18, the overall contraction of the seal 12 may be reduced or minimized as compared to seals that do not include the second material 34. Accordingly, the core 20 with the second material 34 that has a lower coefficient of thermal expansion than the first material 32 of the seal body 18 may facilitate the sealing ability and/or increase the effectiveness of the seal 12 in low temperatures.

In some embodiments, the second material 34 may have a negative coefficient of thermal expansion such that the second material 34 contracts with increasing temperature and expands with decreasing temperature, and the first material 32 may have a positive coefficient of thermal expansion. For example, the second material 34 may be a shape-memory alloy with a negative coefficient of thermal expansion. Thus, by forming the core 20 with the second material 34 that has a negative coefficient of thermal expansion, the overall contraction of the seal 12 may be reduced, minimized, or avoided as compared to seals that do not include the second material 34, which may facilitate the sealing ability and/or increase the effectiveness of the seal 12 in low temperatures. In some embodiments, the seal 12 may include the core 20 formed of the second material 34 with a negative coefficient of thermal expansion, and the total volume of the seal 12 may remain substantially unchanged (e.g., within 5% of a baseline volume at a baseline temperature or room temperature) in low temperatures. In some embodiments, a reduction in size (e.g., volume) of the seal 12 (i.e., including the second material 34 with a coefficient of thermal expansion less than the first material 32) from exposure to a low temperature may be between approximately 10% and 95%, 15% and 85%, 20% and 75%, 25% and 65%, or 30% and 55% of a reduction in size of a seal (e.g., without the core 20 having the second material 34) from exposure to the same low temperature.

As discussed below, in some embodiments, the second material 34 of the core 20 may reduce or minimize damage to the seal 12 cause by explosive gas decompression (e.g., rapid gas decompression). Explosive gas decompression of the seal 12 may otherwise occur when gases diffuse or permeate into the seal 12. In particular, at high pressure, gases may diffuse into the seal 12 in a compressed state. When the pressure is rapidly reduced, the compressed gases in the seal 12 may rapidly expand. The rapidly expanding gases may cause cracks and/or fissures to form in the seal 12, which may damage the seal 12, reduce the sealing ability and/or reliability of the seal 12, and/or reduce the lifetime of the seal 12.

To reduce or minimize damage caused by explosive gas decompression, the second material 34 may be less susceptible to gas diffusion than the first material 32. That is, the second material 34 may have a lower permeability to gases than the first material 32. Permeability (e.g., intrinsic permeability, $\kappa$) is a measure of the ability of a material (e.g., the first material 32 or the second material 34) to allow fluids (e.g., gases) to pass through it. In some embodiments, the gas permeability of the second material 34 may be between approximately 1% and 90%, 5% and 80%, 10% and 70%, or 20% and 50%, or less than 50%, of the gas permeability of the first material 32, for example. In certain embodiments, the gas permeability of the second material 34 may be less than 0.9, 0.5, 0.4, 0.3, 0.2, 0.1, 0.05, or 0.01 times the gas permeability of the first material 34. In some embodiments, the second material 34 may be between approximately 10% and 500%, 20% and 400%, 30% and 300%, 40% and 200%, or 50% and 100% less permeable to gases than the first material 32. In other words, the second material 34 may be at least 1.1, 1.2, 1.3, 1.4, 1.5, two, three, four, five, or more times more resistant to gas diffusion or permeation than the first material 32. In certain embodiments, the first material 32 may include an elastomeric material (e.g., an elastomer), such as natural rubber, synthetic rubber, nitrile rubber, silicone rubber, polyisoprene, polybutadiene, ethylene propylene rubber, fluoroelastomer, a thermoplastic elastomer (TPE), and so forth. In certain embodiments, the second material 34 may include a metallic material (e.g., a metal or metal alloy), such as steel, iron, titanium, tungsten, platinum, a nickel-based alloy (e.g., a nickel-iron alloy, a nickel-titanium alloy, etc.), and so forth. In some embodiments, the second material 34 may include a thermoplastic polymer (e.g., polytetrafluoroethylene (PTFE), polyether ether ketone (PEEK), etc.), a plastic (e.g., a high temperature plastic), or any other material with a lower permeability to gases than the first material 32.

In certain embodiments, gas molecules may diffuse or permeate into the second material 34 at a slower rate than through the first material 32. For example, the second material 34 may have a lower gas diffusion rate (e.g., lower gas permeation rate, a lower gas permeability, etc.) than the first material 32. In some embodiments, the second material 34 may have a gas diffusion rate that is between approximately 1% to 90%, 5% to 80%, 10% to 70%, 15% to 60%, or 20% to 50%, or less than 50%, of the gas diffusion rate of the first material 32. In some embodiments, the second material 34 may have a gas diffusion rate that is less than 0.9, 0.5, 0.4, 0.3, 0.2, 0.1, 0.05, or 0.01 times the gas diffusion rate of the first material 32. In certain embodiments, gas molecules may not readily diffuse or permeate into the second material 34 such that an amount of gas molecules that may diffuse into the second material 34 is negligible or insignificant (e.g., is below a threshold for gas saturation that may likely cause damage if explosive gas decompression occurs). In some embodiments, the second material 34 may block or prevent gas diffusion.

Thus, by forming the core 20 with the second material 34 that is less permeable to gas diffusion than the first material 32 of the seal body 18, fewer gas molecules may be disposed in (e.g., internal to) the second material of the core 20 as compared to the first material 32 of the seal body 18. Accordingly, the majority (e.g., more than 50%), a substantial portion (e.g., 75%, 80%, 90%, 95%, 98%, 99%, or more), or all of the gas molecules that diffuse into and are internal to the seal 12 may be internal to the first material 32 of the seal body 18 (i.e., and not internal to the second material 34 of the core 20). As such, the majority, a substantial portion, or all of the gas molecules that diffuse into the seal 12 may be closer to the outer surface 26 of the seal body 18 as compared to seals without the core 20. Indeed, the core 20 may reduce a maximum distance 36 that gas molecules, which diffused into the first material 32 and are blocked or prevented from diffusing into the second material 34, may travel from the outer surface 26 of the seal body 18. In this manner, gas molecules may more readily diffuse into and out of the seal body 18. As such, the core 20 may increase the likelihood and/or the number of gas molecules that diffuse out of the seal body 18 and out of the seal 12 before the gas molecules expand and before explosive gas decompression occurs, which may reduce, minimize, or prevent damage to the seal 12 caused by explosive gas decompression. Further, because a relatively low or negligible amount of gas molecules may diffuse into the second material 34, damage to the core 20 cause by explosive gas decompression may be reduced, minimized, or avoided, which may reduce or minimize overall damage to the seal 12 and may protect the seal 12 when exposed to extreme conditions (e.g., temperatures, pressures, gases, etc.). Thus, the core 20 with the second material 34 that is less permeable to gas diffusion than the first material 32 of the seal body 18 may reduce or minimize damage to the seal 12 caused by explosive gas decompression, may increase the reliability and robustness of the seal 12, and may increase the lifespan of the seal 12.

Figure 2:
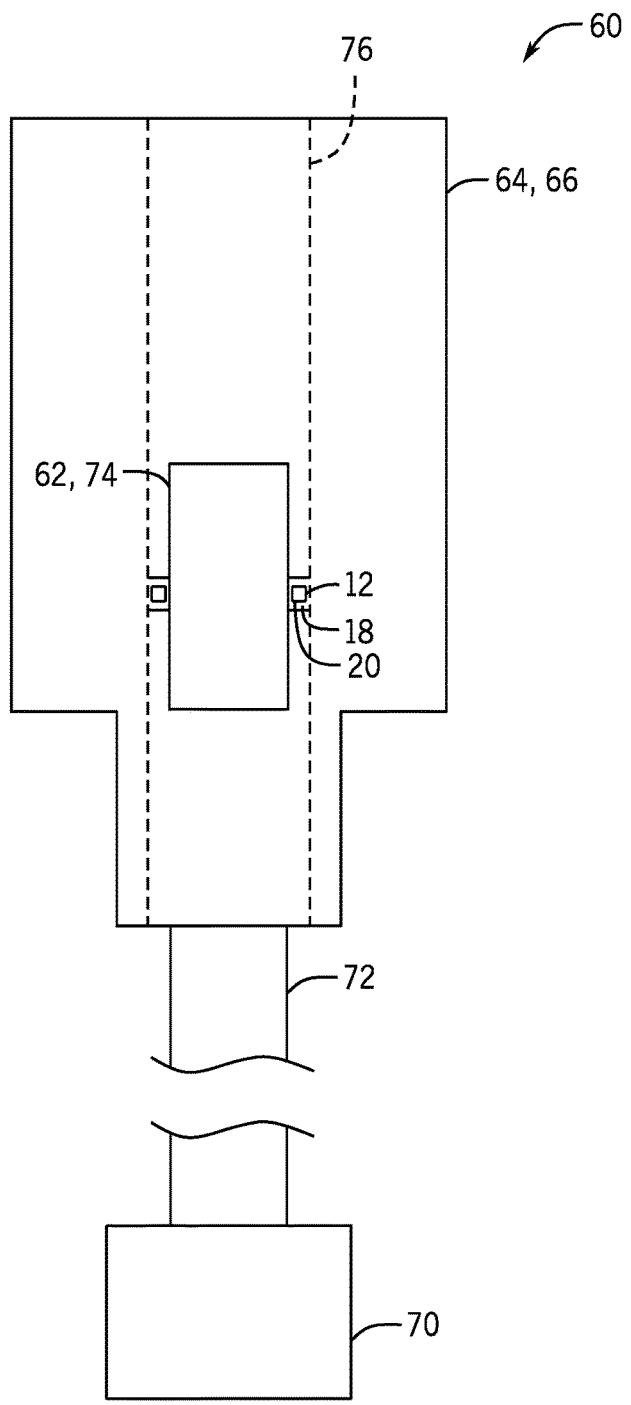
FIG. 2 is cross-sectional view of a mineral extraction system including a seal having a seal body and a core disposed within the seal body, in accordance with an embodiment of the present disclosure.

FIG. 2 illustrates a cross-sectional view of an embodiment a mineral extraction system 60 including the seal 12 having the seal body 18 and the core 20. As illustrated, the seal 12 is disposed between an inner body 62 and an outer body 64. In some embodiments, the seal 12 may be curved (e.g., annular, oval, etc.) or linear (e.g., flat, straight, planar, etc.). It should be appreciated that the cross-section of the illustrated seal 12 may represent a variety of shapes, such as a square, a circle, an oval, a trapezoid, a T-shape, an irregular shape, and so forth. The mineral extraction system 60 may be configured to extract subterranean natural resources, such as oil and gas. In some embodiments, the outer body 64 may include a wellhead 66 coupled to a mineral deposit 70 via a well 72. Additionally, in certain embodiments, the inner body 62 includes a hanger 74 (e.g., tubing hanger, casing hanger, etc.) disposed in a wellhead bore 76 and supported by the wellhead 66. It should be appreciated that in the inner and outer bodies 62 and 64 may include any number of components, such as Christmas trees, spools, casing hangers, casing heads, casing strings, tubing hangers, tubing heads, tubing strings, running tools, blowout preventers, valves, flanges, and the like. Further, in mineral extraction systems 60 and other systems 10, the seal 12 may be used with working pressures that are 20,000 psi or greater. In other words, in certain embodiments, the seal 12 may be used to isolate regions of gases or fluids with pressure differentials across the seal 12 of 30 MPa, 70 MPa, 100 MPa, or greater. Further, the operating environment of the mineral extraction system 60 may include temperatures ranging from −45° C. to 210° C., for example.

Figure 3:
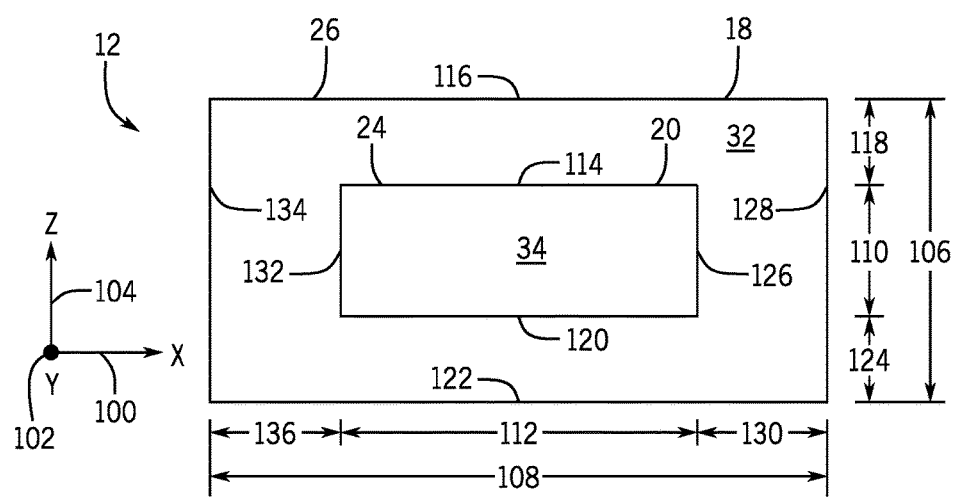
FIG. 3 is a cross-sectional view of a seal having a seal body and a core disposed within the seal body, illustrating dimensions of the seal body and the core, in accordance with an embodiment of the present disclosure.

FIG. 3 illustrates a cross-sectional view of an embodiment of the seal 12 including the seal body 18 and the core 20, showing dimension indicators for the seal body 18 and the core 20. In some embodiments, the seal 12 may be curved (e.g., annular, oval, etc.) or linear (e.g., flat, straight, planar, etc.). It should be appreciated that the cross-section of the illustrated seal 12 may represent a variety of shapes, such as a square, a circle, an oval, a trapezoid, a T-shape, an irregular shape, and so forth. In the following discussion, reference may be made to various directions or axes, such as an x-axis 100, a y-axis 102, and a z-axis 104. It should be noted that the y-axis 102 may extend in a linear direction or along a curved path (e.g., circumferentially about an axis, a circular path, etc.). In an annular embodiment of the seal 12, the y-axis 102 is a circumferential axis, the z-axis 104 is a radial axis, and the x-axis 100 is an axial axis. The seal body 18 includes a height 106 (e.g., a maximum height) and a width 108 (e.g., a maximum width). Additionally, the core 20 includes a height 110 (e.g., a maximum height) and a width 112 (e.g., a maximum width). As illustrated, the height 110 and the width 112 of the core 20 are smaller than the height 106 and the width 108 of the seal body 18, respectively. In some embodiments, the height 110 of the core 20 may be between approximately 10% and 80%, 15% and 70%, 20% and 60%, 25% and 50%, or 30% and 40% of the height 106 of the seal body 18. Additionally, in some embodiments, the width 112 of the core 20 may be between approximately 10% and 80%, 15% and 70%, 20% and 60%, 25% and 50%, or 30% and 40% of the width 108 of the seal body 18. In some embodiments, the height 106 and/or width 108 of the seal body 18 may be greater than 1.1, 1.2, 1.3, 1.4, 1.5, 1.6, 1.7, 1.8, 1.9, 2, or 3 times the height 110 and/or width 112, respectively, of the core 20. Further, in some embodiments, a volume of the seal body 18

Further, the outer surface 24 of the core 20 may include a first outer face 114 that is spaced apart from a first outer face 116 of outer surface 26 of the seal body 18 by a first distance 118 (e.g., a first portion of the height 106 of the seal body 18). Additionally, in some embodiments, a second outer face 120 of the core 20 may be spaced apart from a second outer face 122 of the seal body 18 by a second distance 124 (e.g., a second portion of the height 106 of the seal body 18). In some embodiments, the first distance 118 may be substantially equal (e.g., within manufacturing tolerances) to the second distance 124. As such, the core 20 may be generally centered within the seal body 18 with respect to the height 106 of the seal body 18 (e.g., centered along the z-axis 104). In some embodiments, the first distance 118 and the second distance 124 may be different, and the core 20 may be offset within the seal body 18 with respect to the height 106 of the seal body 18. Further, a third outer face 126 of the core 20 may be spaced apart from a third outer face 128 of the seal body 18 by a third distance 130 (e.g., a first portion of the width 108 of the seal body 18). Additionally, in some embodiments, a fourth outer face 132 of the core 20 may be spaced apart from a fourth outer face 134 of the seal body 18 by a fourth distance 136 (e.g., a second portion of the width 108 of the seal body 18). In some embodiments, the third distance 130 may be substantially equal (e.g., within manufacturing tolerances) to the fourth distance 136, and the core 20 may be generally centered within the seal body 18 with respect to the width 108 of the seal body 18 (e.g., centered along the x-axis 100). In certain embodiments, the third distance 130 and the fourth distance 136 may be different, and the core 20 may be offset within the seal body 18 with respect to the width 108 of the seal body 18. Additionally, the first distance 118, the second distance 124, the third distance 130, and the fourth distance 136 may the same or different. Further, in some embodiments, the core 20 may be centered or offset with respect to both the height 106 and width 108 of the seal body 18.

Figure 4:
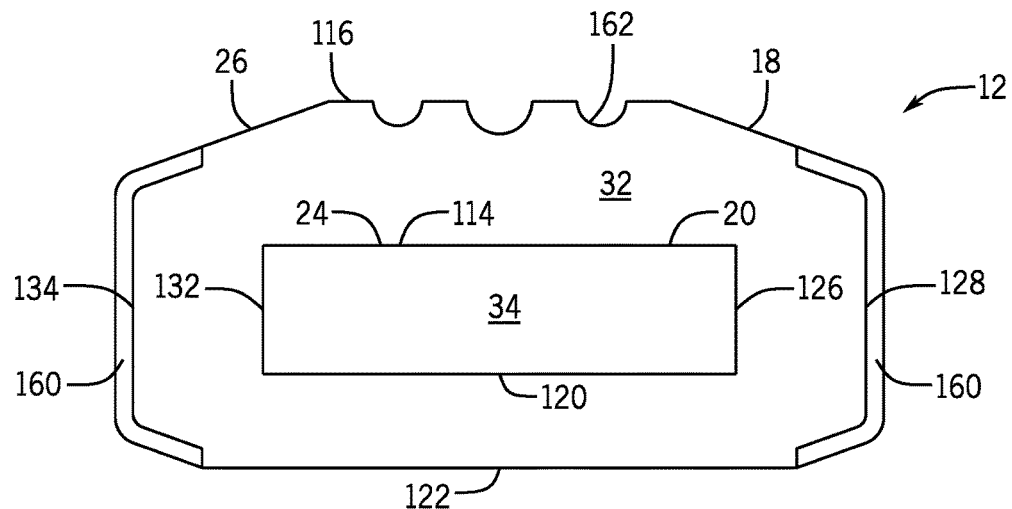
FIG. 4 is a cross-sectional view of a metal end cap seal having a seal body and a core disposed within the seal body, in accordance with an embodiment of the present disclosure.

FIG. 4 illustrates a cross-sectional view of an embodiment of a Metal-End-Cap seal 12 including the seal body 18 and the core 20. In some embodiments, the Metal-End-Cap seal 12 may be curved (e.g., annular, oval, etc.) or linear (e.g., flat, straight, planar, etc.). It should be appreciated that the cross-section of the illustrated Metal-End-Cap seal 12 may represent a variety of shapes, such as a square, a circle, an oval, a trapezoid, a T-shape, an irregular shape, and so forth. As illustrated, the Metal-End-Cap seal 12 includes metal caps 160 disposed on portions of the outer surface 26 of the seal body 18. For example, in the illustrated embodiment, the metal caps 160 are disposed on the third and fourth outer faces 128 and 134 of the seal body 18. In some embodiments, the metal caps 160 may be disposed on the first and second outer faces 116 and 122 of the seal body 18. The metal caps 160 may reduce, minimize, or block gas diffusion into the Metal-End-Cap seal 12. Further, the metal caps 160 may provide extrusion resistance to the seal 12. The metal caps 160 may be formed of any suitable metal, such as steel, titanium, a nickel alloy, etc. Additionally, the outer surface 26 of the seal body 18 may include one or more grooves 162. For example, the one or more grooves 162 may be formed in the first outer face 116 and/or the second outer face 122. In embodiments in which the seal 12 is annular, the one or more grooves 162 (e.g., ribs) may be annular. As illustrated, the outer surface 24 of the core 20 and the outer surface 26 of the seal body 18 include different geometries and different features. For example, in contrast to the outer surface 26 of the seal body 18, the outer surface 24 of the core 20 does not include any grooves.

Figure 5:
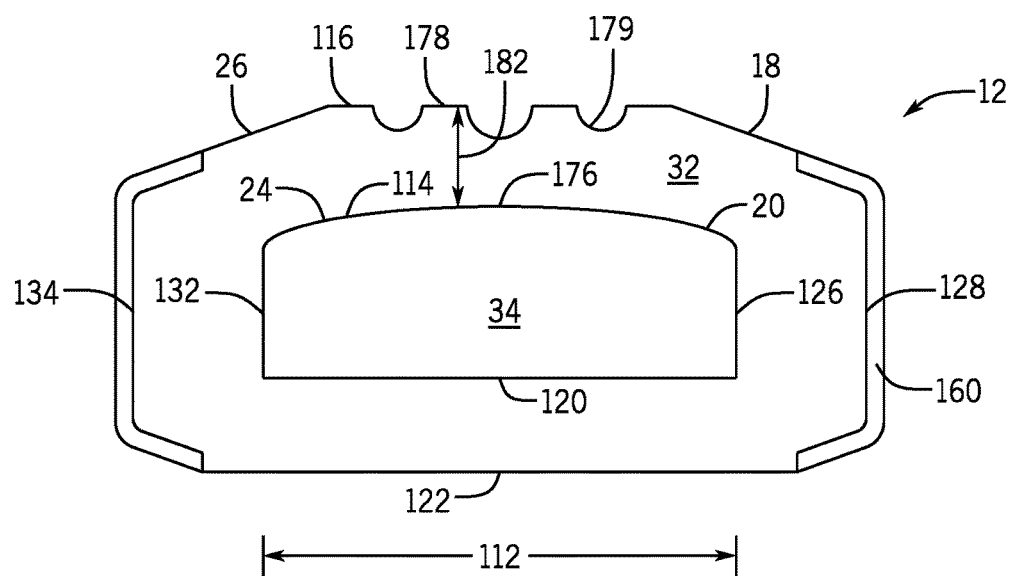
FIG. 5 is a cross-sectional view of a metal end cap seal having a seal body and a core disposed within the seal body, where a portion of an outer surface of the core is similarly contoured to a corresponding portion of an outer surface of the seal body, in accordance with an embodiment of the present disclosure.

FIG. 5 illustrates a cross-sectional view of an embodiment of a Metal-End-Cap seal 12 including the seal body 18 and the core 20 that includes a contoured portion 176 that is similarly contoured to a corresponding portion 178 of the outer surface 26 of the seal body 18. In some embodiments, the Metal-End-Cap seal 12 may be curved (e.g., annular, oval, etc.) or linear (e.g., flat, straight, planar, etc.). It should be appreciated that the cross-section of the illustrated Metal-End-Cap seal 12 may represent a variety of shapes, such as a square, a circle, an oval, a trapezoid, a T-shape, an irregular shape, and so forth. As illustrated, the contoured portion 176 of the core 20 is at least a part of the first outer face 114, and the corresponding portion 178 of the seal body 18 is at least a part of the first outer face 116. As illustrated, the first outer face 114 is contoured to generally match or mirror a shape or feature of (e.g., similarly contoured to) the first outer face 116 of the seal body 18. That is, the first outer face 114 may include a substantially similar curvature and/or substantially similar features (e.g., grooves) as the first outer face 116 of the seal body 18 or a portion thereof. For example, the first outer face 114 of the core 20 includes one or more grooves 179 similar to (e.g., in number, size, shape, and/or spacing) the one or more grooves 162 formed in the first outer face 116 of the seal body 18. In some embodiments, the first outer face 114 of the core 20 may be similarly contoured to the first outer face 116 of the seal body 18 such that a distance 182 between the first outer face 114 of the core 20 and the first outer face 116 of the seal body 18 remains generally constant (e.g., within 5% of an average distance 182) along the width 112 of the core 20. Providing the contoured portion 176 to create the generally constant distance 182 may be desirable in certain embodiments, because it may reduce or minimize the distance that gas molecules may diffuse into the seal body 18, which may facilitate gas diffusion out of the seal body 18 to reduce or minimize damage caused by explosive gas decompression. It should be noted that any portion or portions of the outer surface 24 of the core 20 may be contoured to generally match or mirror (e.g., within manufacturing tolerances) a corresponding portion or portions of the outer surface 26 of the seal body 18. By way of example, in some embodiments, the second outer face 120 of the core 20 (or a portion of the second outer face 120) may be contoured to generally match or mirror (e.g., similarly contoured to, substantially track, follow, or match) the second outer face 122 of the seal body 18 (or a portion of the second outer face 122). Similarly, the third outer face 126 of the core 20 may be contoured to generally match or mirror the third outer face 128 of the seal body 18, and/or the fourth outer face 132 of the core 20 may be contoured to generally match or mirror the fourth outer face 134 of the seal body 18, for example.

Figure 6:
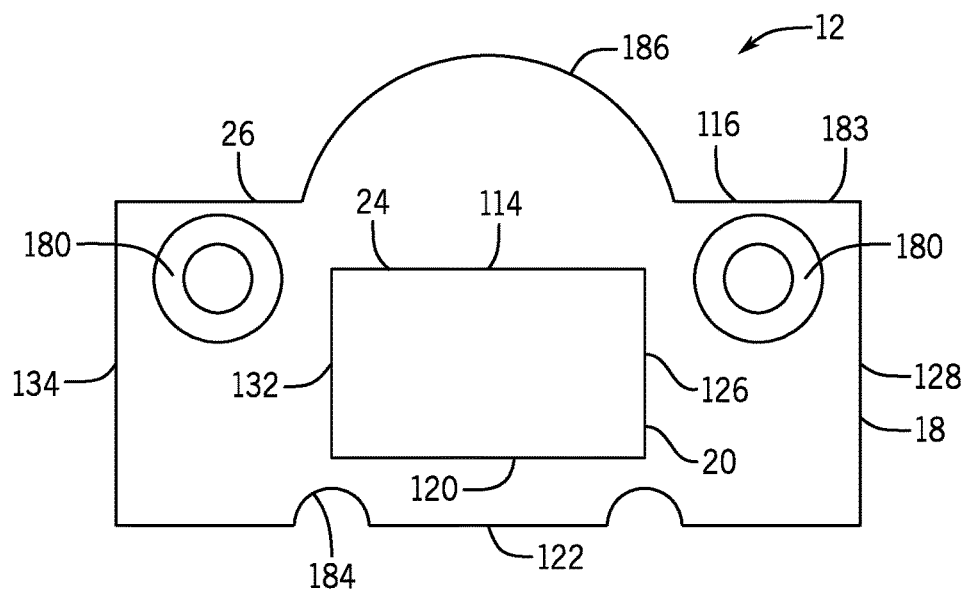
FIG. 6 is a cross-sectional view of an S-seal having a seal body and a core disposed within the seal body, in accordance with an embodiment of the present disclosure.

FIG. 6 illustrates a cross-sectional view of an embodiment of an S-seal 12 including the seal body 18 and the core 20. In some embodiments, the S-seal 12 may be curved (e.g., annular, oval, etc.) or linear (e.g., flat, straight, planar, etc.). It should be appreciated that the cross-section of the illustrated S-seal 12 may represent a variety of shapes, such as a square, a circle, an oval, a trapezoid, a T-shape, an irregular shape, and so forth. As illustrated, the S-seal 12 includes anti-extrusion springs 180, which may provide extrusion resistance to the S-seal 12. The anti-extrusion springs 180 may be integral to (e.g., partially or fully surrounded by) the seal body 18. While the illustrated embodiment of the S-seal 12 includes two anti-extrusion springs 180, it should be noted that the S-seal 12 may include any suitable number of anti-extrusion springs 180 (e.g., one, two, three, four, five, or more). As illustrated, the anti-extrusion springs 180 may be disposed in the seal body 18 near corners 183 (e.g., sharp or rounded corners) of the first outer face 116. However, it should be appreciated that the location of the anti-extrusion springs 180 may vary in different embodiments. The anti-extrusion springs 180 may be made of metal (e.g., steel, titanium, a nickel alloy, etc.), PEEK, or any other suitable hard material. Additionally, the S-seal 12 may include one or more grooves 184 formed in the outer surface 26 of the seal body 18, for example, as illustrated, in the second outer face 122. It should be noted that the one or more grooves 184 may be located in any suitable location about the outer surface 26 of the seal body 18, such as the first outer face 116, the second outer face 122, the third outer face 128, and/or the fourth outer face 134. Further, in some embodiments, the outer surface 26 of the seal body 18 may include one or more protrusions. For example, as illustrated, the first outer face 112 of the seal body 18 may include a protrusion 186. The protrusion 186 may include one or more curved portions, tapered portions, flat portions, irregularly shaped portions, or any combination thereof. As illustrated, the outer surface 24 of the core 20 and the outer surface 26 of the seal body 18 include different geometries and different features. For example, in contrast to the outer surface 26 of the seal body 18, the outer surface 24 of the core 20 does not include any grooves or protrusions. It should be appreciated that in embodiments in which the S-seal 12 is annular, the grooves 184 and/or protrusions 186 may be annular.

Figure 7:
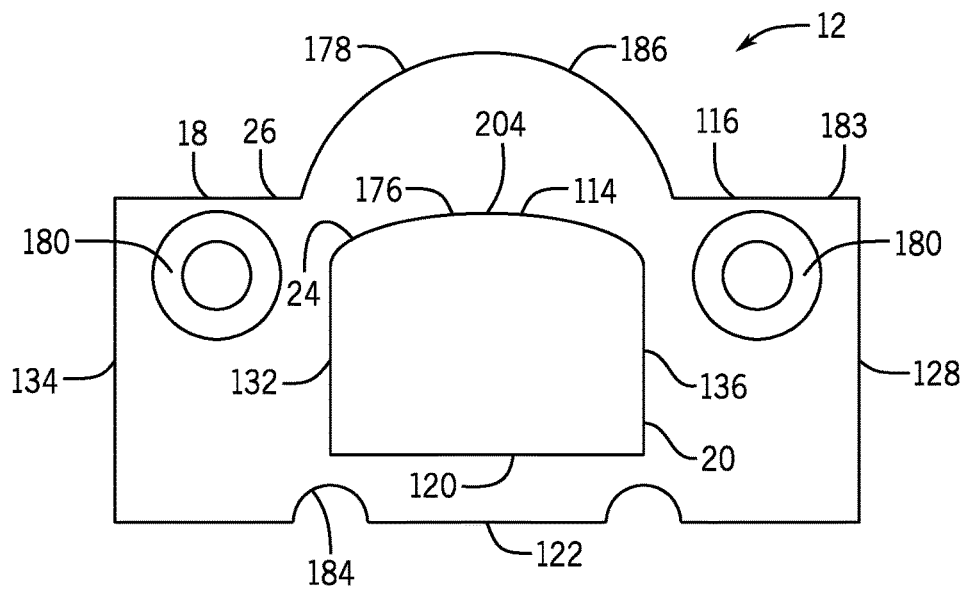
FIG. 7 is a cross-sectional view of an S-seal having a seal body and a core disposed within the seal body, where a portion of an outer surface of the core is similarly contoured to a corresponding portion of an outer surface of the seal body, in accordance with an embodiment of the present disclosure.

FIG. 7 illustrates a cross-sectional view of an embodiment of an S-seal 12 including the seal body 18 and the core 20, where the core 20 includes the contoured portion 176 that is generally contoured to match or mirror a shape or feature of (e.g., contoured similarly to) the corresponding portion 178 of the seal body 18. In some embodiments, the S-seal 12 may be curved (e.g., annular, oval, etc.) or linear (e.g., flat, straight, planar, etc.). It should be appreciated that the cross-section of the illustrated S-seal 12 may represent a variety of shapes, such as a square, a circle, an oval, a trapezoid, a T-shape, an irregular shape, and so forth. As illustrated, the contoured portion 176 of the core 20 is the at least a part of the first outer face 114, and the corresponding portion 178 of the seal body 18 is at least a part of the first outer face 116. As illustrated, the first outer face 114 of the core 20 is generally contoured to match or mirror (e.g., similarly contoured to, substantially track, follow, or match) the first outer face 116 of the seal body 18. That is, the contoured portion 176 of the first outer face 114 may include a substantially similar shape or feature (e.g., within manufacturing tolerances), such as a protrusion 204, as the protrusion 186 of the contoured portion 178 of the seal body 18. Again, it should be noted that any portion or portions of the outer surface 24 of the core 20 may be contoured to substantially match, mirror, track, or follow (e.g., within manufacturing tolerances) a corresponding portion or portions of the outer surface 26 of the seal body 18.

Figure 8:
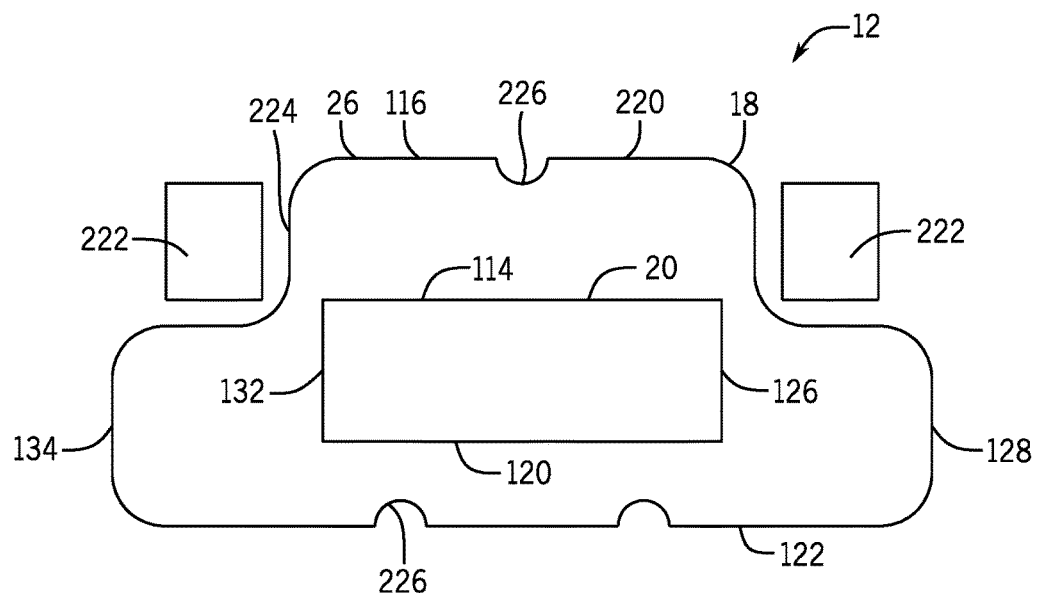
FIG. 8 is a cross-sectional view of a T-seal having a seal body and a core disposed within the seal body, in accordance with an embodiment of the present disclosure.

FIG. 8 illustrates a cross-sectional view of an embodiment of a T-seal 12 including the seal body 18 and the core 20. In some embodiments, the T-seal 12 may be curved (e.g., annular, oval, etc.) or linear (e.g., flat, straight, planar, etc.). It should be appreciated that the cross-section of the illustrated T-seal 12 may represent a variety of shapes, such as a square, a circle, an oval, a trapezoid, a T-shape, an irregular shape, and so forth. As illustrated, the outer surface 26 of the seal body 18 includes a protrusion 220 (e.g., a t-shaped protrusion 220). Additionally, the T-seal 12 may include one or more anti-extrusion rings 222 to provide extrusion resistance to the seal 12. In some embodiments, the anti-extrusion rings 222 may be integral to the protrusion 220. In certain embodiments, the anti-extrusion rings 222 may abut outer surfaces 224 of the protrusion 220. The anti-extrusion rings 222 may be formed of a metal, PEEK, or any other suitable hard material. Additionally, in some embodiments, the outer face 26 of the seal body 18 may include one or more grooves 226, which may be formed in the first outer face 116 and/or the second outer face 122, for example. As illustrated, the outer surface 24 of the core 20 and the outer face 26 of the seal body 18 include different geometries and different features. For example, in contrast to the outer surface 26 of the seal body 18, the outer surface 24 of the core 20 does not include any grooves or protrusions.

Figure 9:
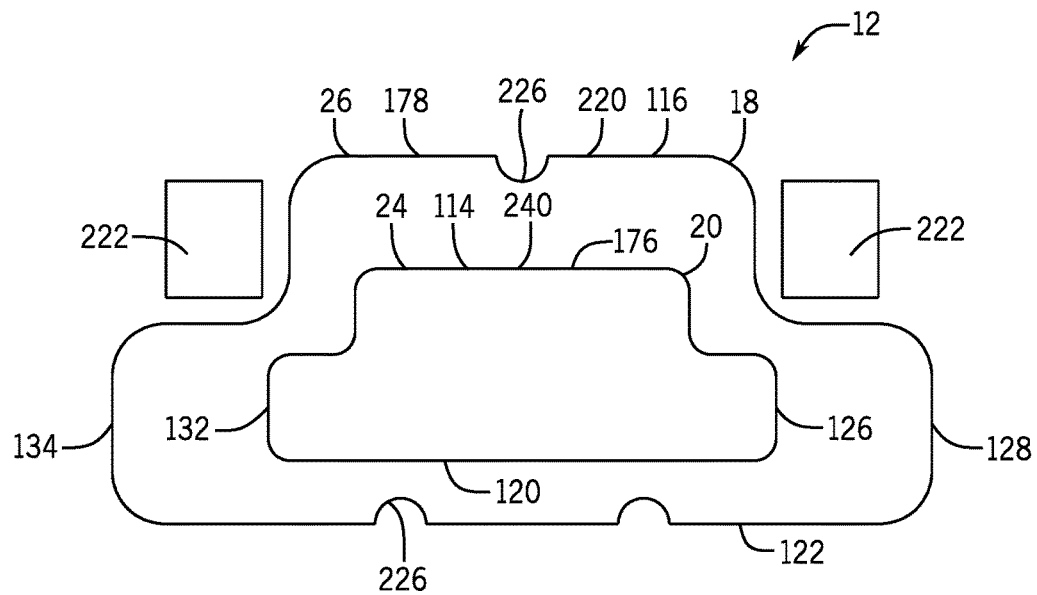
FIG. 9 is a cross-sectional view of a T-seal having a seal body and a core disposed within the seal body, where a portion of an outer surface of the core is similarly contoured to a corresponding portion of an outer surface of the seal body, in accordance with an embodiment of the present disclosure.

FIG. 9 illustrates a cross-sectional view of an embodiment of a T-seal 12 including the seal body 18 and the core 20 that includes the contoured portion 176 of the core 20 that is generally contoured to match or mirror the corresponding portion 178 of the seal body 18. In some embodiments, the T-seal 12 may be curved (e.g., annular, oval, etc.) or linear (e.g., flat, straight, planar, etc.). It should be appreciated that the cross-section of the illustrated T-seal 12 may represent a variety of shapes, such as a square, a circle, an oval, a trapezoid, a T-shape, an irregular shape, and so forth. As illustrated, the contoured portion 176 of the core 20 is at least a part of the first outer face 114, and the corresponding portion 178 of the seal body 18 is at least a part of the first outer face 116. As illustrated, the first outer face 114 is generally contoured to match or mirror a shape or feature of (e.g., similarly contoured to) the first outer face 116 of the seal body 18. That is, the contoured portion 176 of the first outer face 114 may include a substantially similar shape or feature (e.g., within manufacturing tolerances), such as a protrusion 240, as the protrusion 220 of the contoured portion 178 of the seal body 18. Again, it should be noted that any portion or portions of the outer surface 24 of the core 20 may be contoured to generally match or mirror (e.g., within manufacturing tolerances) a corresponding portion or portions of the outer surface 26 of the seal body 18.

Figure 10:
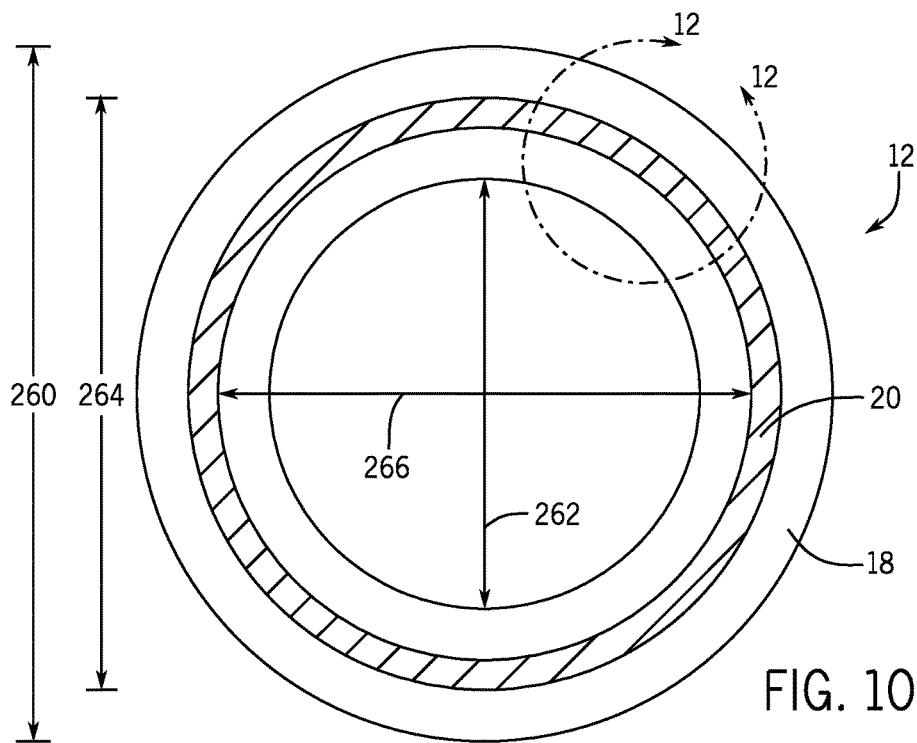
FIG. 10 is a cross-sectional view of an annular seal having a seal body and a core disposed within the seal body, in accordance with an embodiment of the present disclosure.

FIG. 10 illustrates a cross-sectional view of an annular seal 12 including the seal body 18 and the core 20. In some embodiments, the annular seal 12 may be an O-ring seal, a T-seal, or an S-seal. As illustrated, the core 20 may be disposed internally within and surrounded by the seal body 18. The seal body 18 may be annular and may include an outer diameter 260 and an inner diameter 262. Additionally, in some embodiments, the core 20 may be annular and may include an outer diameter 264 and an inner diameter 266. In some embodiments, the outer diameter 264 of the core 20 may be less than the outer diameter 260 of the seal body 18. Further, in some embodiments, the inner diameter 266 of the core 20 may be greater than the inner diameter 262 of the seal body 18. In some embodiments, the core 20 may be continuous about its circumference or length. As discussed in more detail below with reference to FIG. 12, in certain embodiments, the core 20 may be segmented and/or otherwise discontinuous about the circumference of the seal 12.

Figure 11:
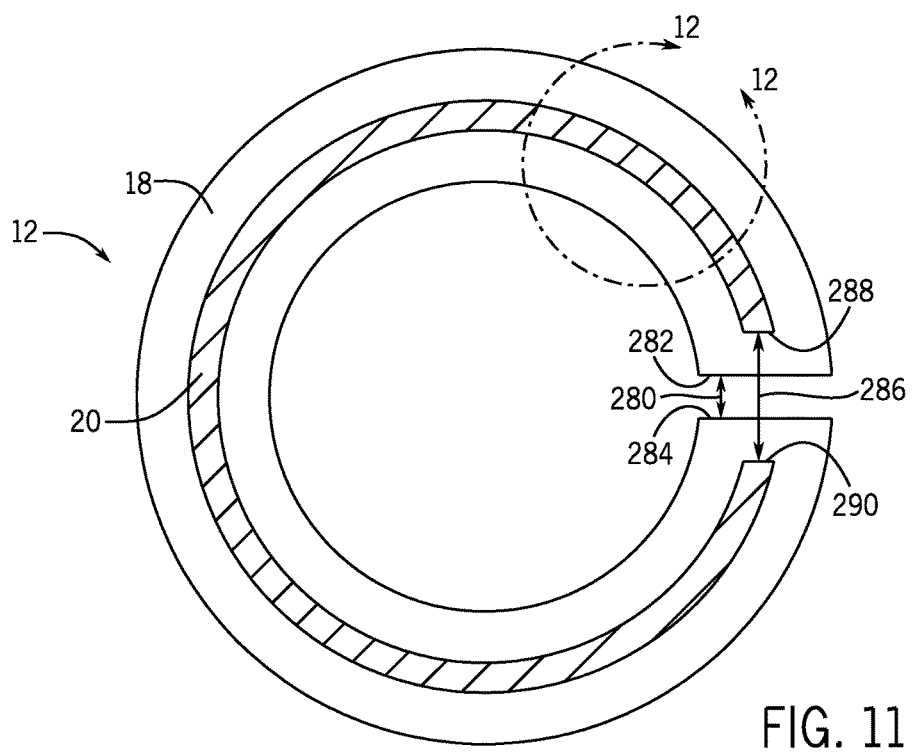
FIG. 11 is a cross-sectional view of a split ring seal having a seal body and a core disposed within the seal body, in accordance with an embodiment of the present disclosure.

FIG. 11 illustrates a cross-sectional view of a split-ring seal 12 including the seal body 18 and the core 20. For example, the split-ring seal 12 may be a C-ring seal. In particular, the seal body 18 may include a gap 280 between first and second ends 282 and 284. Additionally, the core 20 may include a gap 286 between first and second ends 288 and 290. Gaps 280 and 286 may be of similar or the same dimension or may differ, as shown.

Figure 12:
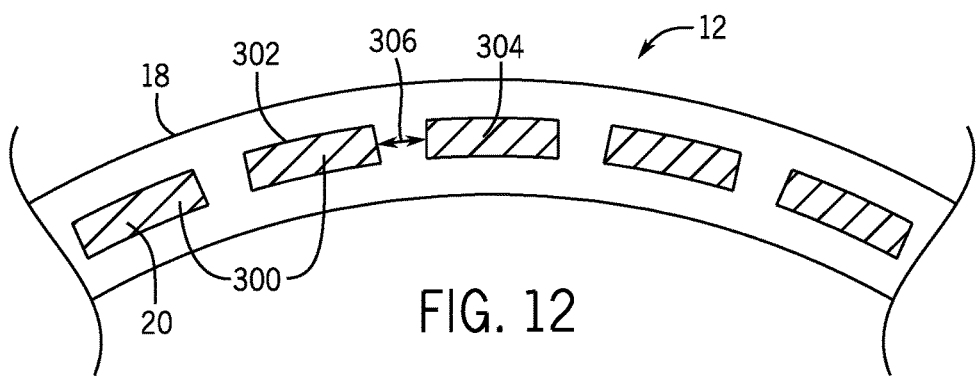
FIG. 12 is a cross-sectional view taken within line 12-12 of FIG. 10 or line 12-12 of FIG. 11 and illustrating a segmented core, in accordance with an embodiment of the present disclosure.

For example, FIG. 12 is a cross-sectional view taken within line 12-12 of FIG. 10 and line 12-12 of FIG. 11 illustrating an embodiment of the seal 12 including the seal body 18 and a segmented core 20. In particular, the segmented core 20 may include a plurality of core segments 300. In some embodiments, each core segment 300 of the plurality of core segments 300 may have the same dimensions. In certain embodiments, the dimensions of two or more of the core segments 300 of the plurality of core segments 300 may be different from one another. In some embodiments, two or more of the core segments 300 may abut one another. In certain embodiments, two or more of the core segments 300 may be spaced apart. For example, as illustrated, a first core segment 302 may be spaced apart from a second core segment 304 by a distance 306. It should be noted that in embodiments in which the core segments 300 are spaced apart, the distance 306 may be substantially constant or may vary between each pair of neighboring core segments 300.

Figure 13:
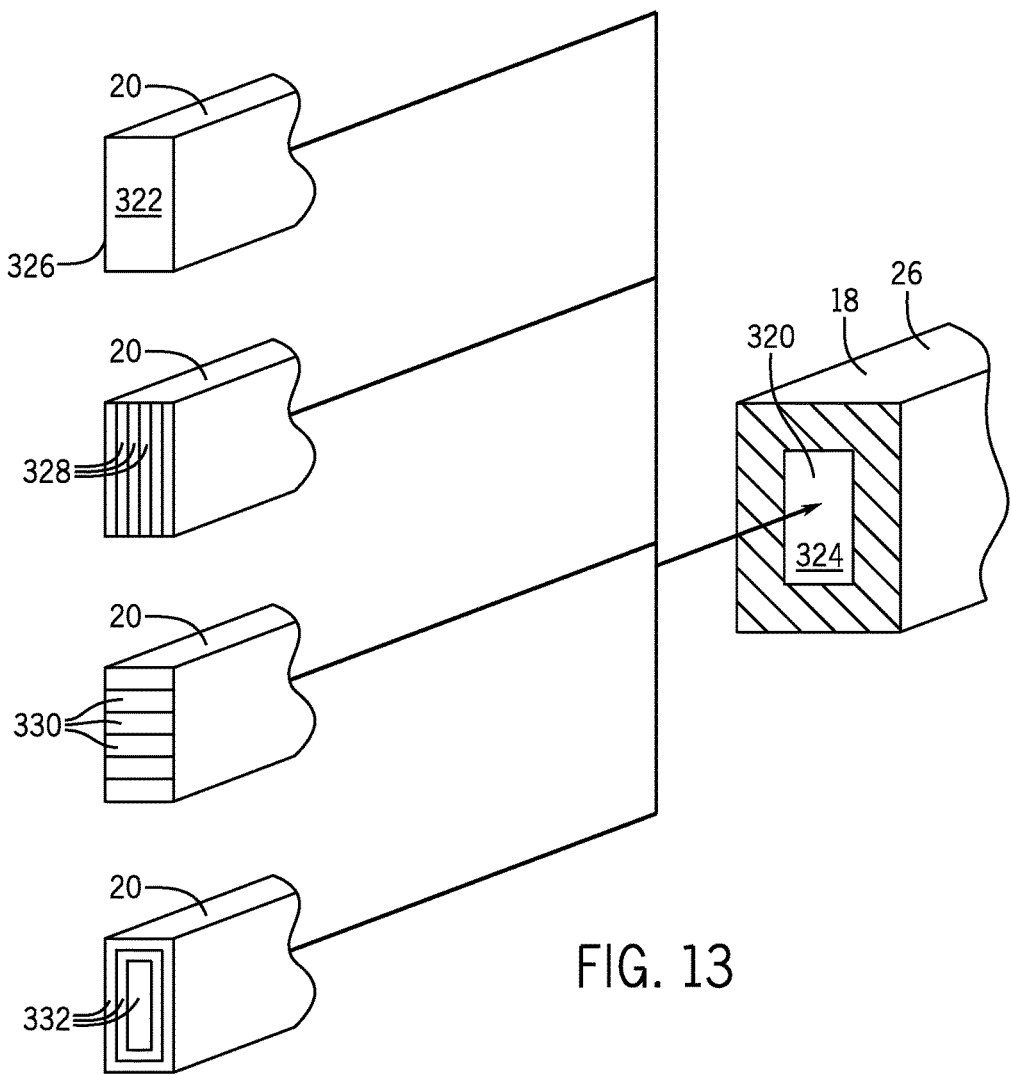
FIG. 13 is a schematic diagram of a seal body and different embodiments of seal cores that are insertable within the seal body to form a seal, in accordance with an embodiment of the present disclosure.

FIG. 13 is a schematic diagram of various embodiments of the core 20 that may be inserted into the seal body 18 to assemble or manufacture the seal 12. For example, in some embodiments, the seal body 18 and the core 20 may be manufactured separately and then assembled together to form the seal 12. For example, the seal body 18 may be preformed (e.g., extruded seal body 18) with an interior chamber (e.g., an opening or passage) 320 configured to receive the core 20. The interior chamber 320 may be any suitable shape, such as a rectangle, a square, a circle, an oval, a trapezoid, a T-shape, an irregular shape, and so forth. In some embodiments, a portion of the interior chamber 320 or the entire interior chamber 320 may be contoured to match or mirror a shape or feature of the outer surface 26 of the seal body 18. The core 20 may be preformed (e.g., extruded, laminated, or stacked layers, etc.) with a cross-sectional area 322 that is less than or equal to a cross-sectional area 324 of the interior chamber 320, and the core 20 may be inserted into the passage 320 of the seal body 18 to form the seal 12. For example, in some embodiments, the cross-sectional area 322 may be between approximately 1% and 10% smaller than the cross-sectional area 324 of the passage 320 to facilitate insertion of the core 20.

It should be noted that a plurality of different cores 20 may be manufactured that may be suitable for use with the seal body 18. For example, in some embodiments, the core 20 may include a single preform 326. In certain embodiments, the core may include a plurality of vertical layers 328 (e.g., oriented in a radial direction for an annular seal 12), a plurality of horizontal layers 330 (e.g., oriented in an axial direction for an annular seal 12), and/or a plurality of concentric layers 332. For example, the vertical layers 328, horizontal layers 330, and/or the concentric layers 332 may be formed separately (e.g., separately extruded) and may be assembled together (e.g., via welding, diffusion, bonding, an adhesive, etc.). In some embodiments, each of the layers of the core 20 (e.g., the vertical layers 328, horizontal layers 330, and/or the concentric layers 332) may be formed of the same material (i.e., the second material 34). In certain embodiments, two or more layers of the core 20 (e.g., the vertical layers 328, horizontal layers 330, and/or the concentric layers 332) may be formed from different materials, such as different types of the second material 34 as discussed above. For example, in some embodiments, two or more layers of the core 20 may be formed from two or more different metallic materials (e.g., steel and a nickel alloy). In some embodiments, each of the layers of the core 20 (e.g., the vertical layers 328, horizontal layers 330, and/or the concentric layers 332) may have the same dimensions. In certain embodiments, two or more layers of the core 20 may have at least one dimension (e.g., height, width, length, etc.) that is different from one another. Further, in some embodiments, two or more layers of the core 20 may have different properties, such as a different coefficient of thermal expansion, a different gas permeability, a different stiffness, etc. In one embodiment, the core 20 the properties (e.g., coefficient of thermal expansion, gas permeability, stiffness, etc.) of the layers of the core 20 may progressively increase or decrease from one layer to the next. Further, in some embodiments, the seal body 18 may be formed from two or more materials such that at least one of the materials is the first material 32. In some embodiments, the seal body 18 may be formed from two or more different types of the first material 32 (e.g., a first type of elastomer and a second type of elastomer). It should be noted that FIG. 13 illustrates some embodiments for manufacturing the seal 12, and the seal 12 may be manufactured using other techniques. For example, in some embodiments, the seal body 18 and the core 20 may be co-extruded.

Reference throughout this specification to "one embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

Although the present disclosure has been described with respect to specific details, it is not intended that such details should be regarded as limitations on the scope of the invention, except to the extent that they are included in the accompanying claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a seal, comprising:
a seal body comprising an exterior surface configured to interface with a structure; and
a core disposed internally within and surrounded by the seal body, wherein the core comprises an outer surface configured to contact and interface with the seal body, a radial distance between the exterior surface and the outer surface is substantially constant along a total width of the core, the seal body comprises an elastomer, the core comprises a metal, and the radial distance between the exterior surface and the outer surface remains within five percent of an average radial distance between the exterior surface and the outer surface across the total width of the core.

2. The system of claim 1, wherein the metal comprises steel, iron, titanium, tungsten, a nickel-based alloy, or a combination thereof.

3. The system of claim 1, wherein the seal is annular.

4. The system of claim 1, wherein a total height of the core is between 20% and 50% of a total height of the seal body, the total width of the core is between 20% and 50% of a total width of the seal body, or both.

5. The system of claim 1, wherein the core comprises a plurality of layers, and at least two of the plurality of layers comprise different materials from one another, different gas permeability from one another, different coefficient of thermal expansion from one another, or any combination thereof.

6. The system of claim 5, wherein the seal is annular.

7. The system of claim 1, wherein the exterior surface of the seal body and the outer surface of the core are curved along at least a portion of the total width of the core.

8. The system of claim 1, wherein the core comprises a material comprising a negative coefficient of thermal expansion.

9. The system of claim 1, wherein the core comprises multiple physically separate core segments disposed within the seal body.

10. The system of claim 1, wherein the seal comprises a T-seal.

11. The system of claim 1, wherein the seal comprises one or more anti-extrusion rings.

12. The system of claim 1, wherein the core comprises a plurality of layers that are stacked relative to one another along an axial axis of the seal.

13. The system of claim 1, wherein the core comprises a plurality of layers that are stacked relative to one another along a radial axis of the seal.

* * * * *